United States Patent
Kessaev et al.

(10) Patent No.: US 6,272,845 B2
(45) Date of Patent: Aug. 14, 2001

(54) ACOUSTIC IGNITER AND IGNITION METHOD FOR PROPELLANT LIQUID ROCKET ENGINE

(75) Inventors: Khoze Kessaev; Vassili Zinoviev; Vladimir Demtchenko, all of Moscow (RU)

(73) Assignee: Sociate Nationale d'Etude et de Construction de Moteurs d'Aviation - S.N.E.C.M.A., Paris (FR)

( * ) Notice: Subject to any disclaimer, the term of this patent is extended or adjusted under 35 U.S.C. 154(b) by 0 days.

(21) Appl. No.: 09/757,411

(22) Filed: Jan. 9, 2001

Related U.S. Application Data

(62) Division of application No. 09/367,800, filed as application No. PCT/FR97/02392 on Dec. 23, 1997, now Pat. No. 6,199,370.

(51) Int. Cl.$^7$ ....................................... C06D 5/00
(52) U.S. Cl. .............................................. 60/212
(58) Field of Search ....................... 60/204, 212, 39.821, 60/39.06; 102/205, 224, 380

(56) References Cited

U.S. PATENT DOCUMENTS

| | | |
|---|---|---|
| 3,630,151 | 12/1971 | Rakowsky . |
| 3,811,359 | 5/1974 | Marchese et al. . |
| 3,982,488 | 9/1976 | Rakowsky et al. . |
| 5,109,669 | 5/1992 | Morris et al. . |

FOREIGN PATENT DOCUMENTS

1537967 A1    1/1990  (SU) .

OTHER PUBLICATIONS

L. Stabinsky, "Analytical and Experimental Study of Resonance Ignition Tubes" NASA CR136934, Dec. 1, 1973, pp. 13–39**.

*Primary Examiner*—Timothy S. Thorpe
*Assistant Examiner*—Ehud Gartenberg
(74) *Attorney, Agent, or Firm*—Weingarten, Schurgin, Gagnebin & Hayes LLP

(57) ABSTRACT

The invention concerns an acoustic igniter for igniting a mixture of rocket fuels in a liquid propellant rocket engine combustion chamber comprising a cylindrical precombustion chamber (101) including a cylindrical wall (111) and first and second end walls (112, 113), a rocket fuel injection nozzle (103) emerging into the precombustion chamber (101) through the first end wall (112) via an orifice of diameter $d_n$, a rocket fuel injector (104) arranged inside said nozzle (103) along the axis thereof, at least an outlet orifice (102) of minimum diameter $d_f$ provided in the cylindrical wall (111), an acoustic resonator (105) defining a cavity opening into the precombustion chamber (101) opposite the nozzle (103), through the second end wall (113), via an orifice (151) of diameter $d_r$. The acoustic resonator (105) is enclosed by a housing (106) which defines around the acoustic resonator (105) a closed auxiliary chamber (160) which communicates only with the precombustion chamber (101) by at least one conduit (107).

6 Claims, 2 Drawing Sheets

ACOUSTIC IGNITER AND IGNITION METHOD FOR PROPELLANT LIQUID ROCKET ENGINE

This application is a divisional application under §1.53(b) of prior application Ser. No. 09/367,800, filed Aug. 19, 1999, now U.S. Pat. No. 6,199,370, which is the U.S. national stage entry application No. PCT/FR97/02392 filed Dec. 23, 1997.

FIELD OF THE INVENTION

The present invention relates to an acoustic igniter and to a method of igniting a propelent mixture in the combustion chamber of a liquid propellent rocket engine.

PRIOR ART

Various types of acoustic igniter are already known for use in space to ignite propellent mixtures fed to the combustion chamber of a liquid propellent rocket engine.

Thus, patent document SU-A-1 255 818 has already described an example of an acoustic igniter as shown in FIG. 2. In such an acoustic igniter, a cylindrical precombustion chamber 1 has an injection nozzle 3 on one of its main faces with an injector 4 placed inside the nozzle for feeding fuel, with the injector 4 lying on the axis of the injection nozzle 3. A hollow acoustic resonator 5 is placed across the second main face of the precombustion chamber 1 facing the injection nozzle 3. The acoustic resonator 5 includes a frustoconical first portion that converges from the inlet opening thereof, and a cylindrical second portion that defines a cavity which terminates in an end wall of the cylindrical portion. Outlet orifices 2 of the precombustion chamber 1 enable the burning mixture after ignition to pass towards a downstream chamber 11 which communicates via at least one outlet orifice 21 with a main combustion chamber of a rocket engine.

The acoustic igniter as shown in FIG. 2 operates as follows: a gaseous component, e.g. an oxidizer, is injected under pressure into the injection nozzle 3 where it is subjected to acceleration. Simultaneously, another component, fuel, is injected into the injector 4. Together, the injection nozzle 3 and the injector 4 thus serve to form a propellent mixture in the precombustion chamber 1. A portion of the mixture penetrates into the cavity of the acoustic resonator 5 and remains therein. The resulting shock waves heat up the portion of the mixture situated in the acoustic resonator 5. The mixture catches fire on reaching its ignition temperature. The flame leaves the cavity of the acoustic resonator and ignites all of the mixture in the precombustion chamber 1, after which it escapes via the outlet orifices 2 towards the downstream chamber 11 which itself communicates via an outlet orifice 21 with the main combustion chamber of the rocket engine (not shown).

Prior art acoustic igniters are not optimized with respect to operation or with respect to geometry. In particular, in an acoustic igniter as shown in FIG. 2, a flow of cold gas circulates through the orifices 2 and through the downstream chamber 11 prior to ignition, which cold gas is in contact with the outer wall of the acoustic resonator 5. This contributes to reducing the development of heat inside the acoustic resonator 5 and thus lengthens the time required for ignition. Combustion stability is not very good, and given the low initial temperature of the gaseous component, ignition does not take place with the desirable degree of reliability.

Also known, from patent document SU-A-1 657 883, is an acoustic igniter or a dynamic gas igniter as shown in FIG. 3, in which the fuel gas and the oxidizing agent are injected into a precombustion chamber 10 via an injector 4 and via a concentric injection nozzle 3 thereabout, both facing an acoustic resonator 5 mounted on the opposite wall of the precombustion chamber 1, with the gaseous mixture escaping from the precombustion chamber via at least one orifice 20 that is situated laterally relative to the gas injection assembly 3, 4 and to the acoustic resonator 5. The operation of that acoustic igniter is improved by the fact that the fuel gas injector 4 opens out into the converging portion of the injection nozzle 3, upstream from the outlet of said injection nozzle 3, thus obtaining a mixture that is more uniform and increasing the stability of the ignition process. Nevertheless, the acoustic igniter of FIG. 3 is still not sufficiently reliable, and in particular it does not enable the maximum length of time required for ignition to be reduced.

OBJECT AND BRIEF DESCRIPTION OF THE INVENTION

The present invention seeks to remedy the abovementioned drawbacks, and in particular to provide an acoustic igniter presenting oscillations of greater intensity due to shock waves, smaller thermal losses that are from the acoustic resonator, and in general, operation that is optimized so as to be more stable and more reliable than existing devices, thus contributing in particular to reducing the time required for ignition.

These objects are achieved by an acoustic igniter (FIG. 1) for igniting a mixture of propellents in the combustion chamber of a liquid propellent rocket engine, the igniter comprising a cylindrical precombustion chamber having a cylindrical wall and first and second end walls, a propellent injector nozzle opening out into the precombustion chamber through the first end wall via an orifice of minimum diameter $d_n$, a fuel injector disposed inside said nozzle on the axis thereof, at least one outlet orifice of minimum diameter $d_f$, formed through the cylindrical wall, and an acoustic resonator defining a cavity opening out into the precombustion chamber opposite the nozzle through the second end wall via an opening of diameter $d_r$, the igniter being characterized in that the acoustic resonator is surrounded by a housing which defines an auxiliary chamber around the acoustic resonator, the auxiliary chamber being closed with the inside thereof being in communication only with the precombustion chamber via at least one duct.

According to a preferred characteristic, the acoustic resonator presents, running from its opening: an essentially frustoconical converging portion extended by a cylindrical portion of inside diameter $d_c$ and closed by an end wall that is essentially parallel to the second end wall of the precombustion chamber, and the wall of the cylindrical portion of the acoustic resonator is made of a metal material having thermal conductivity λ which is less than 25 W/m. °C, with the thickness λ of said cylindrical wall being less than $0.1d_c$.

Advantageously, the converging portion of the acoustic resonator has a convergence angle λ lying in the range 10° to 24°0 and the cylindrical portion of the acoustic resonator has an inside diameter $d_c$ lying in the range 0.15 to 0.35 times the diameter $d_r$ of the opening of the acoustic resonator, and a length $l_c$ lying in the range one to three times the diameter $d_r$ of said opening.

In an optimized embodiment, the precombustion chamber has a diameter $d_{ch}$ greater than $2.2d_n$, the distance Δ between the orifice of the nozzle and the opening of the acoustic resonator lies in the range $1.5d_n$ to $3.2d_n$, the diameter $d_r$ of the opening of the acoustic resonator lies in the range $1.1d_n$ to 1.6$d_n$, and the minimum diameter $d_f$ of the outlet orifice lies in the range 2.0$d_n/\sqrt{n}$ to 2.8$d_n/\sqrt{n}$, where n represents the number of outlet orifices and $d_n$ represents the diameter of the orifice of the nozzle.

Preferably, the downstream end of the fuel injector is situated in the converging portion of the nozzle.

The invention also provides an ignition method using an acoustic igniter of the invention, the method being characterized in that it consists in a first step of injecting an inert gas under pressure via the nozzle so that at least a portion of the jet of expanded inert gas at the outlet from the nozzle penetrates into the acoustic resonator via its opening to be heated by oscillations due to shock waves until it reaches a temperature suitable for igniting a propellent mixture that is injected during a second step, and in said second step, once said temperature has been reached, the method consists in injecting oxidizer through the nozzle and fuel through the injector to co-operate with the inert gas to form a propellent mixture which penetrates into the acoustic resonator to catch fire on contact with the hot gases and create a flame that then ignites the propellent mixture throughout the precombustion chamber.

The inert gas may be nitrogen, or is preferably helium.

By way of example, the oxidizer may be oxygen and the fuel may be hydrogen.

In a particular implementation, during the second step, the oxidizer and the fuel are injected simultaneously respectively through the nozzle and the injector.

In another particular implementation, during the second step, the oxidizer and the fuel are injected in alternation respectively through the nozzle and through the injector.

BRIEF DESCRIPTION OF THE DRAWINGS

Other characteristics and advantages of the invention appear from the following description of particular embodiments, given as examples and with reference to the accompanying drawings, in which.

DETAILED DESCRIPTION OF PARTICULAR EMBODIMENTS

Figure 1:
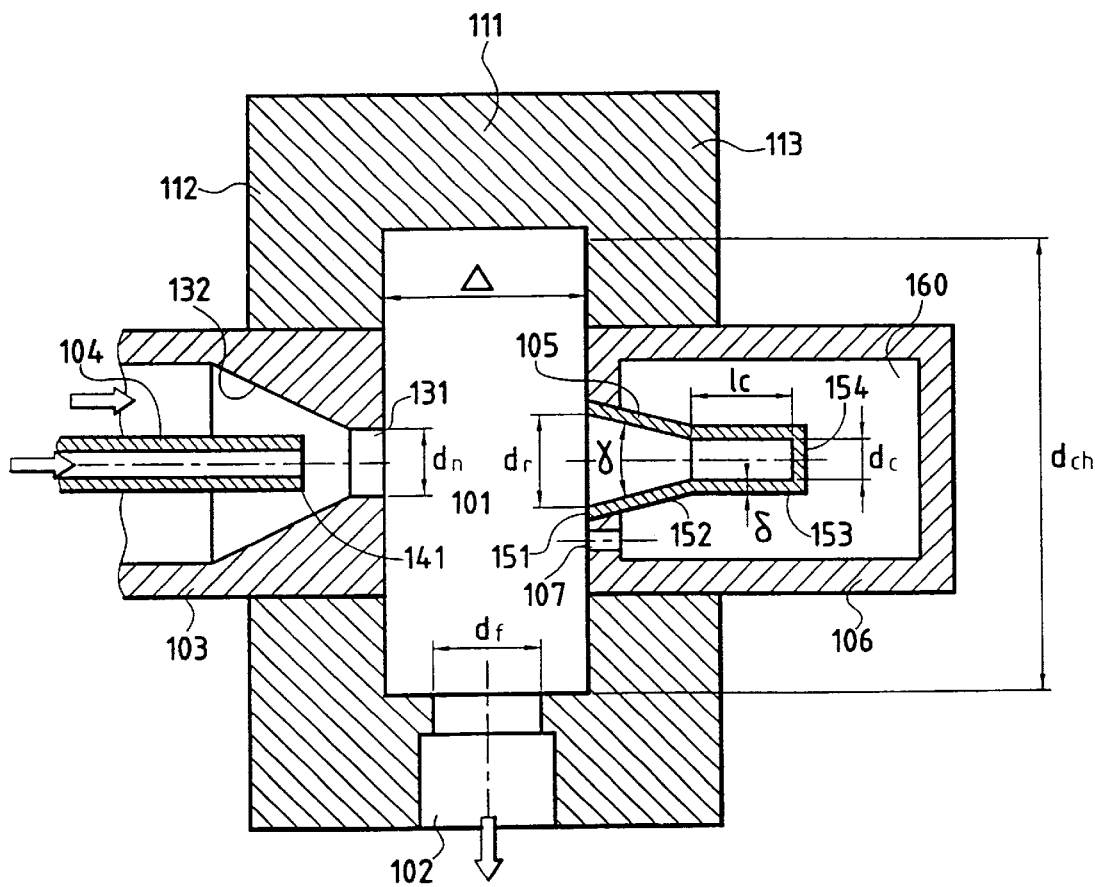
FIG. 1 is an axial section view through an acoustic igniter of the present invention.
Figure 2:
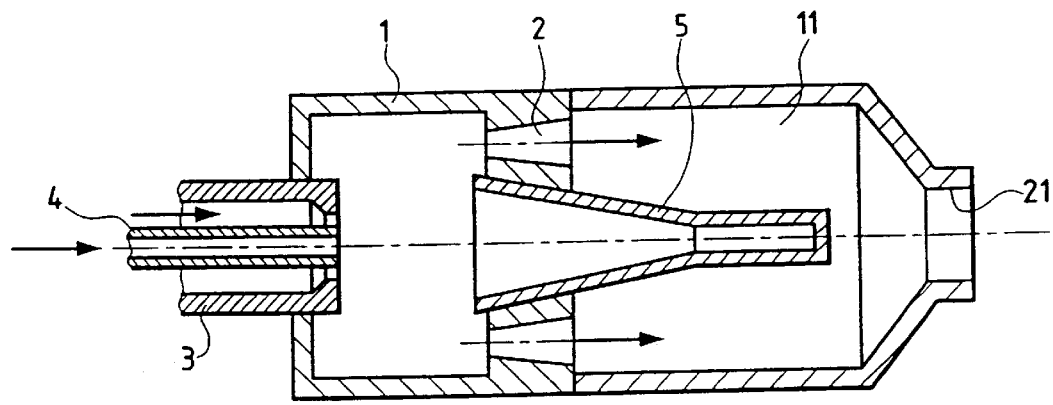
FIG. 2 is an axial section view through a first type of prior art igniter.
Figure 3:
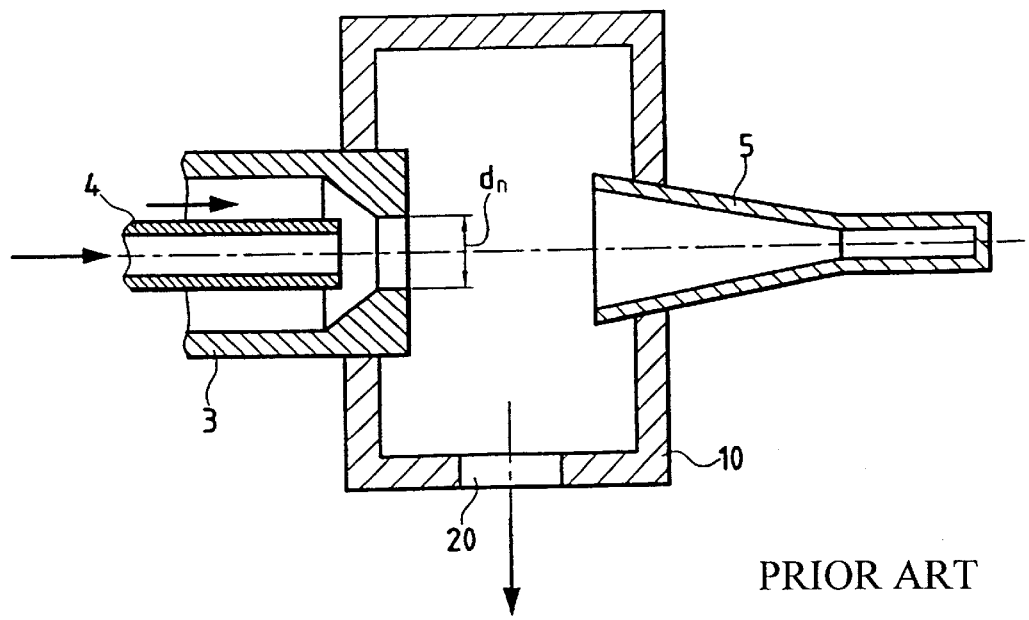
FIG. 3 is an axial section view through a second type of prior art igniter.

Reference is made to FIG. 1 which shows an example of an acoustic igniter of the invention. This acoustic igniter comprises a cylindrical precombustion chamber 1 having a cylindrical wall 111 and essentially plane end walls 112 and 113. One or more outlet orifices 102 each of minimum diameter $d_f$ are provided through the cylindrical wall 111. A propellant injection nozzle 103 opens out into the precombustion chamber 101 through the wall 112 via an orifice 113 of minimum diameter $d_n$. A fuel injection tube 104 is disposed inside the nozzle 103 on its axis and having a downstream end 141 situated in the converging portion 132 of the nozzle 103. An acoustic resonator 105 defines a cavity that opens out into the chamber 101 through the wall 113 via an opening 151 of diameter $d_r$.

The fact that the end of the injector-forming tube 104 terminates inside the nozzle 103, in the converging portion 132 thereof, and is set back from the orifice 131, makes it possible to achieve better gas mixing prior to ignition, and avoids disturbing the structure of the shock waves created between the nozzle 103 and the resonator 105, prior to ignition. The setback position of the downstream end of the injector 104 also makes it possible to avoid discontinuous ignition or the appearance of explosions within the chamber 101.

The shock waves created within the hollow acoustic resonator 105 are all the more intense in that, running from its opening 151, the resonator has an essentially frustoconical converging portion 152 extended by a cylindrical portion 153 of inside diameter $d_c$ and closed by an end wall 154 which is essentially parallel to the end walls 112 and 113 of the chamber 101.

According to the invention, operation of the acoustic resonator 105 is improved by the fact that it is surrounded by a housing 106 which defines a closed auxiliary chamber 160 around the resonator 105, with the inside thereof being in communication only with the precombustion chamber 101, and only via one or more ducts 107 of small section. An empty space is left in the auxiliary chamber 160 between the wall thereof and the outer wall of the resonator 105. The housing 106 prevents heat generated within the resonator 105 being dissipated to the outside environment. The ducts 107 enable acoustic oscillations to penetrate into the inside of the housing 106, thereby providing additional heating of the gas that has penetrated into the empty space between the wall of the housing 106 and the wall of the resonator 105. This helps reduce the time required for ignition.

The cylindrical portion 153 of the resonator 105 is made of a metal material having thermal conductivity $\lambda$ that is less than 25 W/m. °C. The thickness of the wall of said cylindrical portion 153 is preferably less than 0.1 $d_c$ where $d_c$ is the inside diameter of the cylindrical portion 153. The use of metal walls enhances reflection of shock waves and increases the mechanical strength against forces that are exerted cylindrically. By selecting a thin wall together with low thermal conductivity, it is possible to reduce the energy required for heating the walls prior to the instant of ignition, and this also presents a significant flow of heat running along the resonator between the hot end wall of the cylindrical portion 153 of the resonator 105 and the cold inlet opening 151 of the converging portion 152 of the resonator 105. This also contributes to reducing the time required for ignition.

The time required for ignition is further reduced with optimization of the geometrical characteristics of the resonator 105. Thus, it has been observed in practice that the oscillations due to the shock waves inside the resonator 105 are made more intense if the following values are adopted for the various parameters that define the resonator 105:

the convergence angle $\gamma$ of the converging portion 152 should lie in the range 10° to 24°;

the inside diameter of the cylindrical tubular portion 153 should lie in the range 0.15$d_r$ to 0.35$d_r$; and the length of the cylindrical tubular portion 153 should lie in the $d_r$ to 3$d_r$ where $d_r$ designates the diameter of the inlet opening 151 of the resonator 105.

Also, shock wave oscillation in the resonator 105 is enhanced if the various parameters defining the overall structure of the igniter are given values that are determined as follows:

the diameter $d_{ch}$ of the precombustion chamber 101 should be greater than 2.2$d_n$;

the distance $\Delta$ between the orifice 131 of the nozzle 103 and the opening 151 of the resonator 105 lies in the range 1.5$d_n$ to 3.2$d_n$;

the diameter $d_r$ of the opening 151 of the resonator 151 lies in the range 1.1$d_n$ to 1.6$d_n$; and the minimum diameter $d_f$ of the outlet orifice 102 lies in the range $2.0 d_n/\sqrt{n}$ and $2.8 d_n/\sqrt{n}$, where n represents the number of outlet orifices, and $d_n$ represents the diameter of the orifice 131 of the nozzle 103.

The invention also relates to an ignition method and to producing flame by means of an acoustic igniter of the type described above, which method contributes both to reducing the time required prior to the appearance of ignition and to extending and stabilizing the flame produced at the moment of ignition.

According to the method, in a first step, an inert gas is injected under pressure via the nozzle 103 such that at least a portion of the jet of expanded inert gas at the outlet from the nozzle 103 is injected into the resonator 105 via the opening 151 to be heated very strongly by the oscillations due to the shock waves.

In a second step, in addition to the inert gas, an oxidizer is injected through the nozzle 103 while a fuel is injected through the injector 104. This gas mixture ignites on coming into contact with the hot walls of the resonator and with the heated inert gas, and it creates a flame which propagates in the precombustion chamber 101 and then passes through the outlet orifice(s) 102, with the jet of flame being directed to the main combustion chamber (not shown) to ignite the main propellant of a rocket engine.

The use of an inert gas reduces the combustion temperature thus making it possible to increase the lifetime of the injector 104 and also the duration and the stability of the flame created thereby.

By way of example, the inert gas may be constituted by nitrogen, or is preferably constituted by helium which provides a greater reduction in the time required prior to ignition.

During the second step of performing the method, and in a first implementation thereof, the oxidizer such as oxygen, and the fuel such as hydrogen, are injected simultaneously respectively through the nozzle 103 and through the injector 102.

In another implementation, during this second step, the oxidizer and the fuel are injected in alternation respectively through the nozzle 103 and through the injector 102.

What is claimed is:

1. A method of ignition using an acoustic igniter for igniting a mixture of propellants in a combustion chamber of a liquid propellant rocket engine, characterized in that it comprises:

a) a first step of injecting an inert gas under pressure via a propellant injection nozzle having an outlet opening out into a precombustion chamber so that a portion of the jet of expanded inert gas at the outlet from the propellant injection nozzle penetrates into an opening of an acoustic resonator defining a cavity opening out into the precombustion chamber opposite the propellant injection nozzle, and another portion of said jet penetrates a housing around said acoustic resonator, whereby said portion of the jet of expanded inert gas having penetrated into the acoustic resonator is heated by oscillations due to shock waves until it reaches a temperature suitable for igniting said mixture of propellants that is to be injected during a second step, and b) a second step which occurs once said temperature has been reached and which consists in injecting an oxidizer through the propellant injection nozzle and a fuel through a fuel injector disposed inside said propellant injection nozzle on the axis thereof, whereby said oxidizer and fuel cooperate with the inert gas to form a mixture of propellants which penetrates into the acoustic resonator to catch fire on contact with the hot inert gas and create a flame that then ignites the mixture of propellants throughout the precombustion chamber.

2. A method according to claim 1, characterized in that the inert gas is helium.

3. A method according to claim 1, characterized in that the inert gas is nitrogen.

4. A method according to claim 1, characterized in that the oxidizer is oxygen and the fuel is hydrogen.

5. A method according to claim 1, characterized in that, during the second step, the oxidizer and the fuel are injected simultaneously respectively through the propellant injection nozzle and the fuel injector.

6. A method according to claim 1, characterized in that during the second step, the oxidizer and the fuel are injected in alternation respectively through the propellant injection nozzle and through the fuel injector.

* * * * *

UNITED STATES PATENT AND TRADEMARK OFFICE
CERTIFICATE OF CORRECTION

PATENT NO. : 6,272,845 B2  Page 1 of 1
DATED : August 14, 2001
INVENTOR(S) : Khoze Kessaev et al.

It is certified that error appears in the above-identified patent and that said Letters Patent is hereby corrected as shown below:

Column 2,
Line 55, "$\lambda$" should read -- $\delta$ --;
Line 57, "$\lambda$" should read -- $\gamma$ --; and
Line 58, "$24^{\circ}$ 0" should read -- $24^{\circ}$ --.

Signed and Sealed this

Eleventh Day of June, 2002

*Attest:*

JAMES E. ROGAN
*Attesting Officer*   *Director of the United States Patent and Trademark Office*